(12) United States Patent
Cheng et al.

(10) Patent No.: US 12,736,856 B2
(45) Date of Patent: Sep. 15, 2026

(54) OPTICAL SYSTEM

(71) Applicant: TDK CORPORATION, Tokyo (JP)

(72) Inventors: Pai-Jui Cheng, Taoyuan City (TW); Shu-Shan Chen, Taoyuan City (TW); Chuan-Min Lee, Taoyuan City (TW)

(73) Assignee: TDK CORPORATION, Tokyo (JP)

( * ) Notice: Subject to any disclaimer, the term of this patent is extended or adjusted under 35 U.S.C. 154(b) by 161 days.

(21) Appl. No.: 18/778,635

(22) Filed: Jul. 19, 2024

(65) Prior Publication Data

US 2025/0036011 A1 Jan. 30, 2025

Related U.S. Application Data

(60) Provisional application No. 63/515,714, filed on Jul. 26, 2023.

(30) Foreign Application Priority Data

Jan. 5, 2024 (CN) ........................ 202420031637.6

(51) Int. Cl.
*G03B 17/56* (2021.01)

(52) U.S. Cl.
CPC .................................. *G03B 17/561* (2013.01)

(58) Field of Classification Search
CPC ..................................................... G03B 17/561
See application file for complete search history.

(56) References Cited

U.S. PATENT DOCUMENTS

2022/0100060 A1* 3/2022 Obana .................. G03B 17/561

FOREIGN PATENT DOCUMENTS

CN 114609747 A 6/2022

* cited by examiner

*Primary Examiner* — Minh Q Phan
(74) *Attorney, Agent, or Firm* — MUNCY, GEISSLER, OLDS & LOWE, P.C.

(57) ABSTRACT

An optical system includes a fixed assembly, a movable part and a driving assembly. The movable part is configured to be connected to an optical module, and the movable part is movable relative to the fixed assembly. The driving assembly is configured to drive the movable part to move relative to the fixed assembly. The optical system further includes a guiding assembly, and the movable part moves relative to the fixed assembly through the guiding assembly.

17 Claims, 12 Drawing Sheets

OPTICAL SYSTEM

CROSS REFERENCE TO RELATED APPLICATIONS

This application claims the benefit of U.S. Application No. 63/515,714, filed on Jul. 26, 2023, and China Patent Application No. 202420031637.6, filed on Jan. 5, 2024, the entirety of which are incorporated by reference herein.

BACKGROUND OF THE INVENTION

Field of the Disclosure

The present disclosure relates to an optical system, and in particular it relates to an optical system with a piezoelectric mechanism.

Description of the Related Art

As technology has developed, many of today's electronic devices (such as smartphones) have a camera with still-image and video functionality. Using the camera modules disposed on electronic devices, users can operate their electronic devices to capture photographs and record videos.

Today's design of electronic devices continues to follow the trend of miniaturization, meaning that the dimensions of the various components of the camera module and its structure must also be continuously reduced, so as to achieve miniaturization. In general, a driving mechanism in a camera module has a camera lens holder configured to hold a camera lens, and the driving mechanism can perform the functions of auto focusing and optical image stabilization. However, although the existing driving mechanism can achieve the aforementioned functions of photographing or video recording, they still cannot meet all the needs of users.

Therefore, how to design a camera module that can perform auto-focus, optical image stabilization, and object tracking at the same time is topic nowadays that needs to be discussed and solved.

BRIEF SUMMARY OF THE INVENTION

Accordingly, one objective of the present disclosure is to provide an optical system to solve the problems described above.

According to some embodiments of the disclosure, an optical system is provided. The optical system includes a fixed assembly, a movable part and a driving assembly. The movable part is configured to be connected to an optical module, and the movable part is movable relative to the fixed assembly. The driving assembly is configured to drive the movable part to move relative to the fixed assembly. The optical system further includes a guiding assembly, and the movable part moves relative to the fixed assembly through the guiding assembly.

According to some embodiments, the fixed assembly has an outer cover and a first base. The outer cover and the first base are arranged along a first axis. The outer cover is fixedly connected to the first base to form an accommodation space. The accommodation space is configured to accommodate the movable part, the optical module and the driving assembly. The optical module and the movable part are arranged along the first axis. The optical module is fixedly disposed on the movable part.

According to some embodiments, the guiding assembly includes a fixed guiding portion and a movable guiding portion. The fixed guiding portion is fixedly connected to the fixed assembly. The fixed guiding portion is fixedly connected to a positioning member of the fixed assembly. The positioning member protrudes from the first base along the first axis. The movable guiding portion is fixedly connected to the movable part. The movable guiding portion is movable relative to the fixed guiding portion. The movable part is configured to rotate with the movable guiding portion relative to the fixed guiding portion and the fixed assembly around the first axis.

According to some embodiments, the driving assembly includes a first power source, a transfer assembly and a contact member. The first power source is configured to generate a first driving force. The first power source includes a first piezoelectric element. The transfer assembly is configured to receive the first driving force and then output an external driving force. The transfer assembly has an elastic structure. The contact member is fixedly connected to the transfer assembly and configured to transmit the external driving force to the movable part. The contact member is configured to be driven by the transfer assembly to switch between a disengaged state and a contact state. In the disengaged state, the contact member is not in contact with the guiding assembly. In the contact state, the contact member is in direct contact with the guiding assembly.

According to some embodiments, when viewed along the first axis, the contact member protrudes from the transfer assembly toward the guiding assembly. The contact member is made of a metal material. The contact member includes tool steel.

According to some embodiments, the contact member has a base portion and a contact portion. The base portion and the contact portion are integrally formed as one piece. When viewed along the first axis, the base portion has a rectangular structure. When viewed along the first axis, the contact portion has an arc-shaped structure. When viewed along the first axis, an extending direction of the contact portion along a second axis passes through a center of the guiding assembly. The second axis is perpendicular to the first axis.

According to some embodiments, the optical module includes an image sensor, which is disposed on a second base of the optical module. The movable guiding portion of the guiding assembly defines a central axis. The central axis is parallel to the first axis. When viewed along a third axis, the central axis passes through the center of the image sensor.

According to some embodiments, the optical system further includes a stopping assembly configured to limit the range of motion of the movable part. The stopping assembly includes a first stopping portion, a second stopping portion and a third stopping portion. The first stopping portion is fixedly disposed on the movable part. The second stopping portion and the third stopping portion are disposed on the first base of the fixed assembly.

According to some embodiments, when viewed along the first axis, the first stopping portion has an arc-shaped structure. The second stopping portion and the third stopping portion each have a columnar structure which extends along the first axis. When viewed along the first axis, the guiding assembly is located between the second stopping portion and the third stopping portion. When the movable part rotates in a first rotating direction, the first stopping portion is configured to be in contact with the second stopping portion. When the first stopping portion is in contact with the second stopping portion, the movable part is located at a first extreme position.

According to some embodiments, when the movable part rotates in a second rotating direction, the first stopping portion is configured to be in contact with the third stopping portion. When the first stopping portion is in contact with the third stopping portion, the movable part is located at a second extreme position. The first rotating direction is opposite to the second rotating direction.

According to some embodiments, the optical system further includes a sensing assembly configured to sense movement of the movable part relative to the fixed assembly. The sensing assembly has a reference element and a sensing element. The sensing element corresponds to the reference element. When viewed along the first axis, the sensing assembly overlaps at least a portion of the guiding assembly.

According to some embodiments, the reference element has a magnetic element. The optical system also includes a separating element, which has a magnetically permeable material. The separating element is disposed between the reference element and the optical module. The reference element is located in a first accommodation portion of the movable part. The sensing element is located in a second accommodation portion of the positioning member.

According to some embodiments, when viewed along the first axis, the first accommodation portion overlaps at least a portion of the second accommodation portion. The first accommodation portion is connected to the second accommodation portion. When viewed along the third axis, the central axis passes through the centers of the reference element and the sensing element.

According to some embodiments, the optical system further includes a circuit assembly which is electrically connected to the optical module. The circuit assembly includes a first basic member which is disposed on the optical module. The first basic member has a plate-shaped structure. The circuit assembly further includes a first line portion which has a plate-shaped structure and is not parallel to the first basic member. The first line portion is located at a first opening of the movable part.

According to some embodiments, the circuit assembly further includes a first extending portion which has a flexible structure. The first extending portion has a plate-shaped structure. The first extending portion has a plurality of curved portions. A part of the first extending portion is located in a second opening of the movable part. The first extending portion is electrically connected to the first basic member via the first line portion. The first extending portion and the first line portion are integrally formed as one piece.

According to some embodiments, the circuit assembly further includes a second line portion which is electrically connected to the first line portion via the first extending portion. The second line portion has a flexible structure. The second line portion, the first extending portion and the first line portion are integrally formed as one piece.

According to some embodiments, when viewed along the first axis, the first line portion, the second line portion and the first extending portion are located around the movable part. When viewed along the first axis, the first line portion, the second line portion and the first extending portion surround the movable part by at least 100 degrees. A first connection terminal of the first line portion is connected to the first basic member. A second connection terminal of the second line portion is connected to a second basic member.

According to some embodiments, the first line portion has a long side which is perpendicular to the first basic member, and the first line portion has an outer side which is parallel to the first axis. The second basic member is electrically connected to the first power source. When viewed along the first axis, an angle formed by the first connection terminal, the center of the guiding assembly and the second connection terminal is greater than 100 degrees.

According to some embodiments, the transfer assembly is fixedly disposed on the movable part. The fixed guiding portion and the positioning member are integrally formed as one piece. The movable guiding portion is located in the fixed guiding portion. The fixed guiding portion surrounds the movable guiding portion.

According to some embodiments, the movable part has a shaft member which extends along the first axis toward the first base. The movable guiding portion is fixedly connected to the shaft member. The movable guiding portion is sheathed on the shaft member. When viewed along a second axis, the transfer assembly overlaps the movable guiding portion, the fixed guiding portion and the shaft member. The contact member is configured to contact the fixed guiding portion to generate a reaction force to drive the driving assembly and the movable part to move relative to the first base.

The present disclosure provides an optical system, which includes a fixed assembly, a movable part and a driving assembly. The movable part is configured to be connected to an optical module, and the movable part is movable relative to the fixed assembly. The driving assembly is configured to drive the movable part to move relative to the fixed assembly. The optical system further includes a guiding assembly, and the movable part moves relative to the fixed assembly through the guiding assembly. The driving assembly can include piezoelectric elements, so that the heavy optical module can be driven quickly.

In some embodiments, the driving assembly includes a transfer assembly, a contact member, a first power source and a second power source. The first power source and the second power source deform according to the external control signals to push the transfer assembly, so that the transfer assembly will deform to drive the contact member to move. The movement trajectory of the contact member may be, for example, elliptical.

When the contact member rotates clockwise rapidly (for example, rotating at a frequency of 1000 Hz), the contact member can drive the movable guiding portion to rotate counterclockwise by contacting the movable guiding portion of the guiding assembly multiple times. On the contrary, when the contact member rotates counterclockwise rapidly, the contact member can drive the movable guiding portion to rotate clockwise by contacting the movable guiding portion multiple times. Based on such a design, the movable part and the optical module can be driven quickly to achieve the functions such as object tracking or optical compensation.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
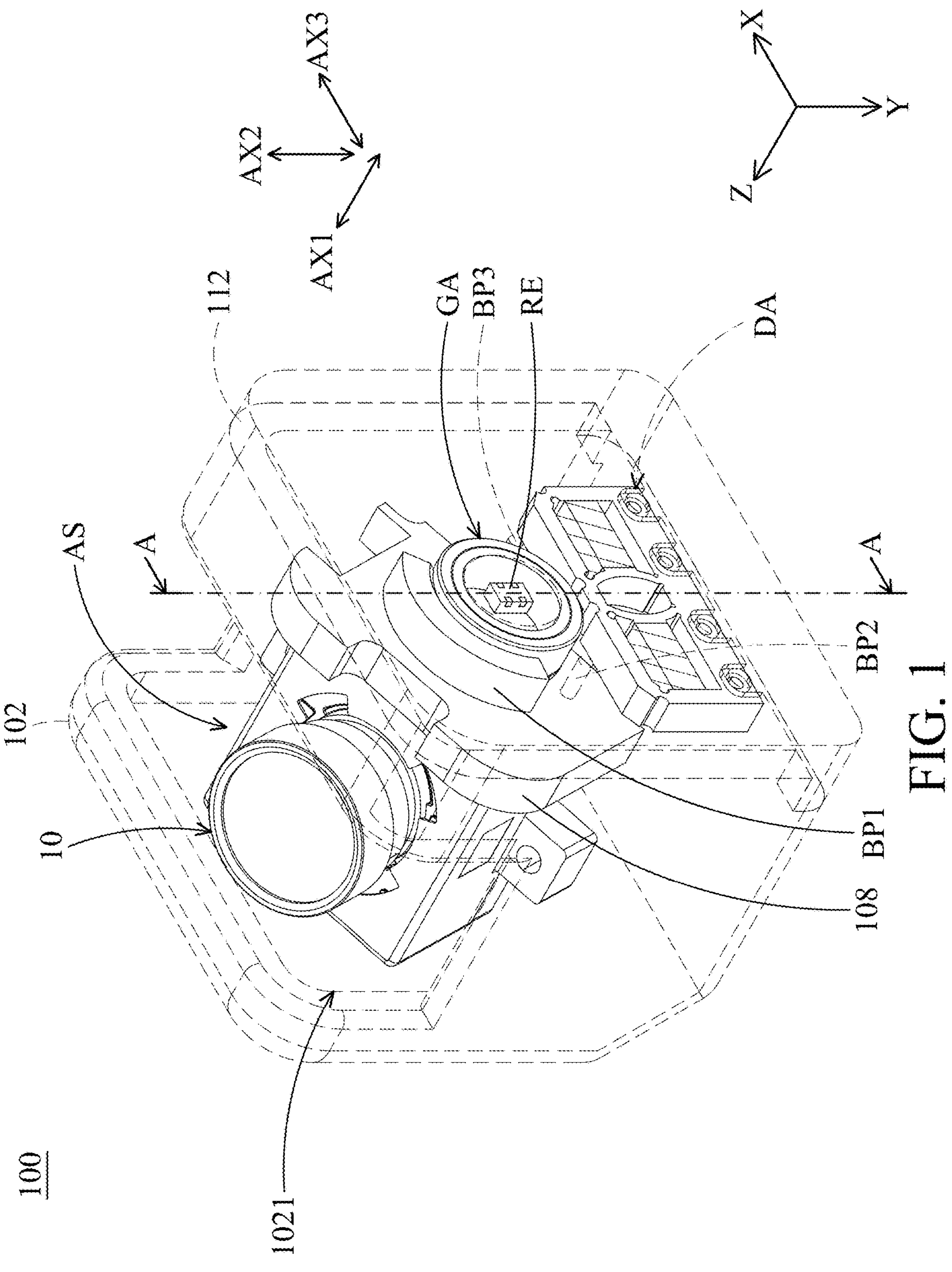
FIG. 1 is a schematic diagram of an optical system 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, “vertical,” “above,” “over,” “below,”, “bottom,” etc. as well as derivatives thereof (e.g., “downwardly,” “upwardly,” etc.) are used in the present disclosure for ease of description of one feature’s relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as “first”, “second”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as “connected” and “interconnected”, refer to a relationship wherein structures are secured or attached to one another either directly or indirectly through intervening structures, as well as both movable or rigid attachments or relationships, unless expressly described otherwise.

Figure 2:
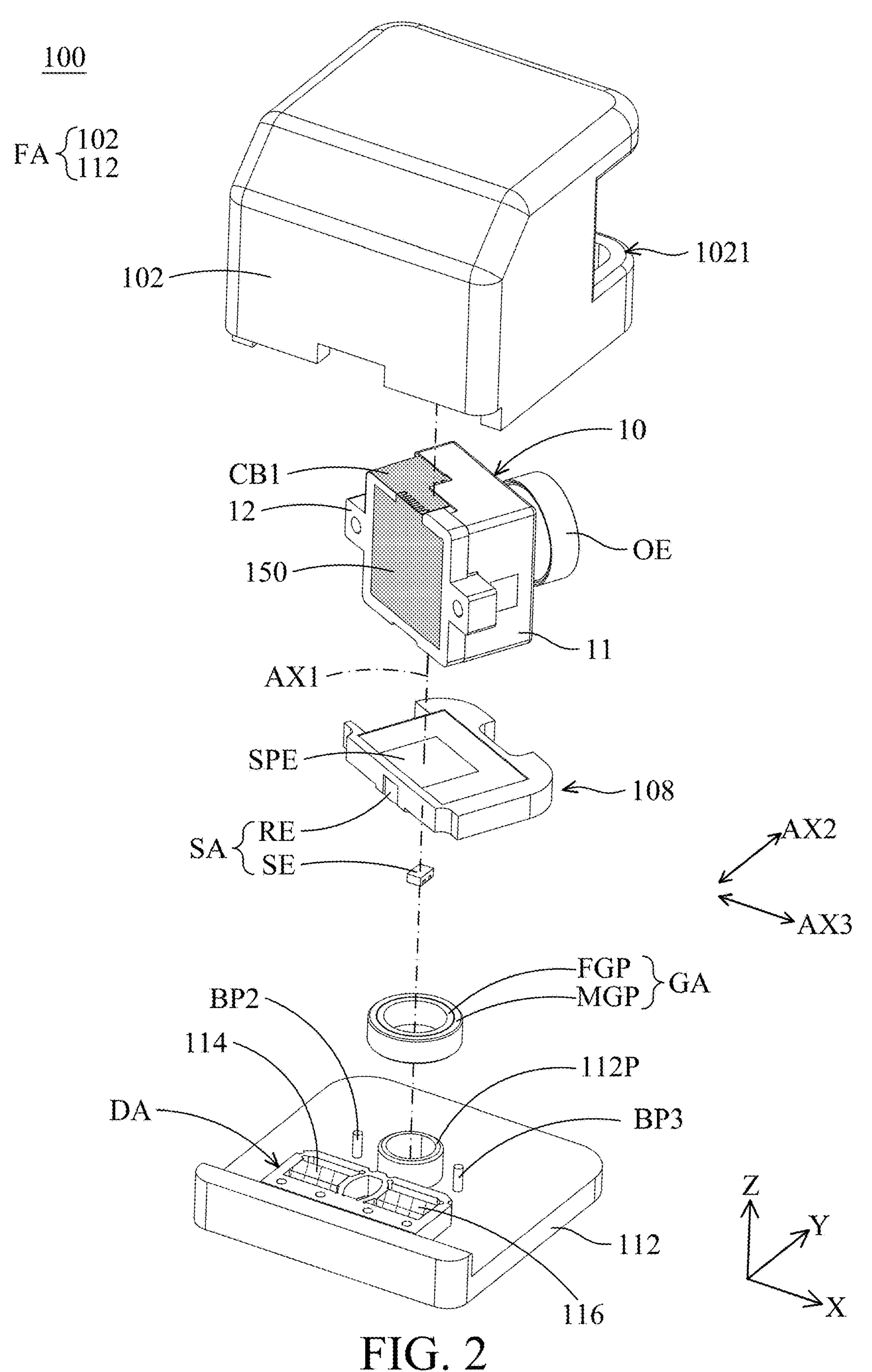
FIG. 2 is an exploded diagram of the optical system 100 according to an embodiment of the present disclosure.
Figure 3:
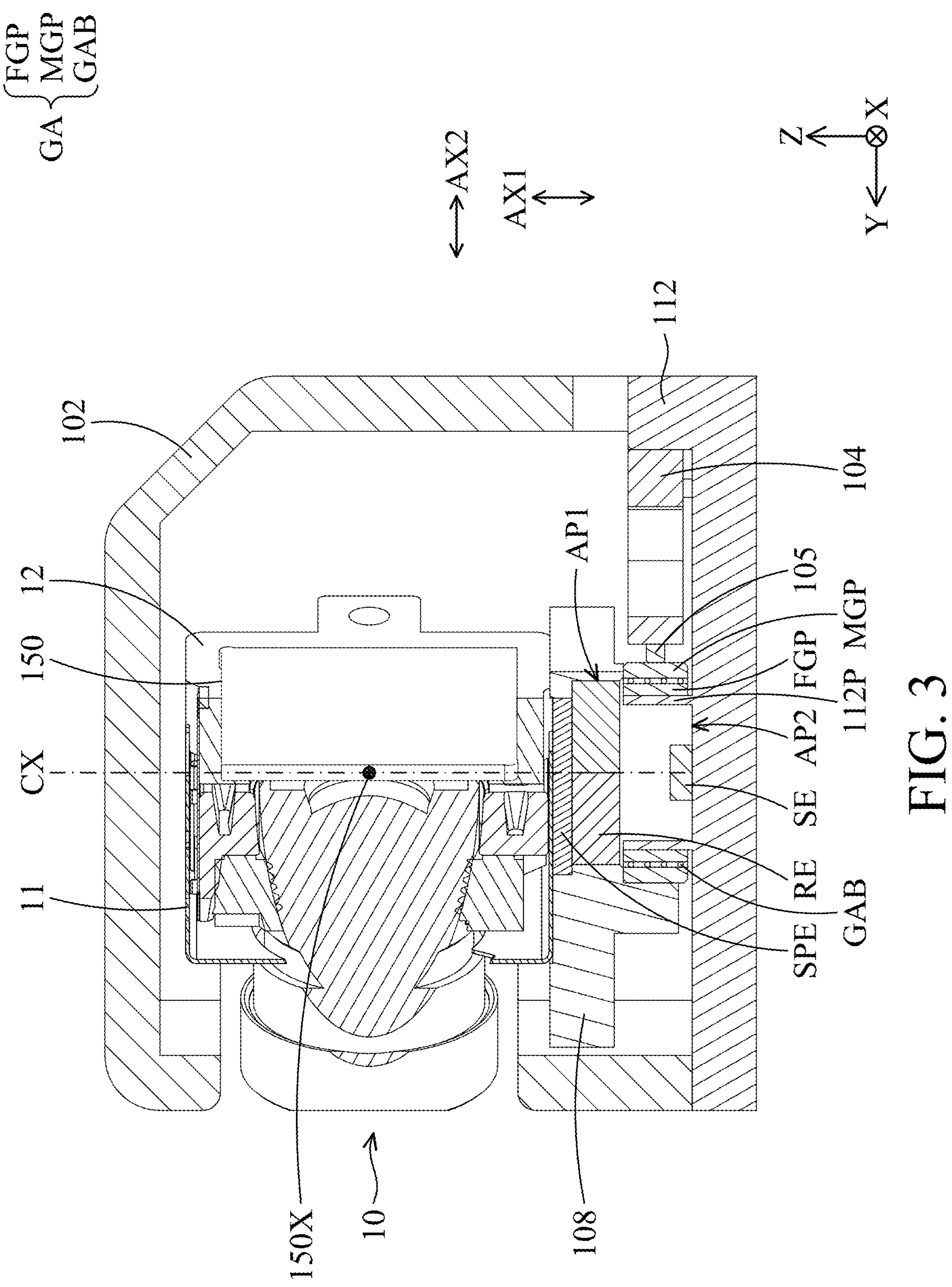
FIG. 3 is a cross-sectional view of the optical system 100 along line A-A in FIG. 1 according to an embodiment of the present disclosure.

Please refer to FIG. 1 to FIG. 3. FIG. 1 is a schematic diagram of an optical system 100 according to an embodiment of the present disclosure, FIG. 2 is an exploded diagram of the optical system 100 according to an embodiment of the present disclosure, and FIG. 3 is a cross-sectional view of the optical system 100 along line A-A in FIG. 1 according to an embodiment of the present disclosure. The optical system 100 can be an optical camera system and can be configured to hold and drive an optical module 10. The optical system 100 can be installed in various electronic devices or portable electronic devices, such as a smartphone or a notebook computer, for allowing a user to perform the image capturing function. In this embodiment, the optical system 100 can be a voice coil motor (VCM) with an auto-focusing (AF) function, but it is not limited thereto. In other embodiments, the optical system 100 can also perform the functions of auto-focusing and optical image stabilization (OIS).

In this embodiment, the optical system 100 may include a fixed assembly FA, a movable part 108, and a driving assembly DA. The movable part 108 is configured to be connected to the optical module 10, and the movable part 108 is movable relative to the fixed assembly FA. The driving assembly DA is configured to drive the movable part 108 to move relative to the fixed assembly FA.

In this embodiment, as shown in FIG. 2, the fixed assembly FA has an outer cover 102 and a first base 112, and the outer cover 102 and the first base 112 are arranged along a first axis AX1. As shown in FIG. 1, the outer cover 102 is fixedly connected to the first base 112 to form an accommodation space AS, and the accommodation space AS is configured to accommodate the movable part 108, the optical module 10 and the driving assembly DA. It should be noted that in order to clearly represent the internal structure, the outer cover 102 and the first base 112 in FIG. 1 are illustrated with dotted lines, but it does not mean that they do not exist.

As shown in FIG. 2, the optical module 10 and the movable part 108 are arranged along the first axis AX1. Specifically, the optical module 10 is fixedly disposed on the movable part 108, and the optical module 10 may include a housing 11, a second base 12, a lens OE and an image sensor 150.

The housing 11 is fixedly connected to the second base 12 and can accommodate the lens OE and the image sensor 150. The image sensor 150 is disposed on the bottom of the second base 12. External light can enter the lens OE from an opening 1021 (FIG. 1) formed by the outer cover 102, and then to be received by the image sensor 150 so as to generate a digital image signal.

Furthermore, the optical module 10 may include a driving mechanism (not shown in the figures) to achieve the aforementioned auto-focusing function. The driving mechanism is, for example, a voice coil motor or a piezoelectric driving mechanism, but it is not limited thereto.

In this embodiment, the optical system 100 may further include a guiding assembly GA, and the movable part 108 moves relative to the fixed assembly FA via the guiding assembly GA. As shown in FIG. 2 and FIG. 3, the guiding assembly GA may include a fixed guiding portion FGP and a movable guiding portion MGP. The fixed guiding portion FGP is fixedly connected to the fixed assembly FA.

Specifically, the fixed guiding portion FGP is fixedly connected to a positioning member 112P of the fixed assembly FA. As shown in FIG. 2 and FIG. 3, the positioning member 112P can be a ring-shaped structure which protrudes from the first base 112 along the first axis AX1.

Furthermore, the movable guiding portion MGP is fixedly connected to the movable part 108, such as being fixed to the bottom of the movable part 108. The movable guiding portion MGP is movable relative to the fixed guiding portion FGP, and the movable part 108 is configured to rotate with the movable guiding portion MGP around the first axis AX1 relative to the fixed guiding portion FGP and the fixed assembly FA.

In this embodiment, as shown in FIG. 3, the guiding assembly GA may be a bearing, and may further include a plurality of rolling balls GAB, which are disposed between the movable guiding portion MGP and the fixed guiding portion FGP. The fixed guiding portion FGP can serve as a stator, for example, and the movable guiding portion MGP can serve as a rotor, for example, but they are not limited thereto.

Figure 4:
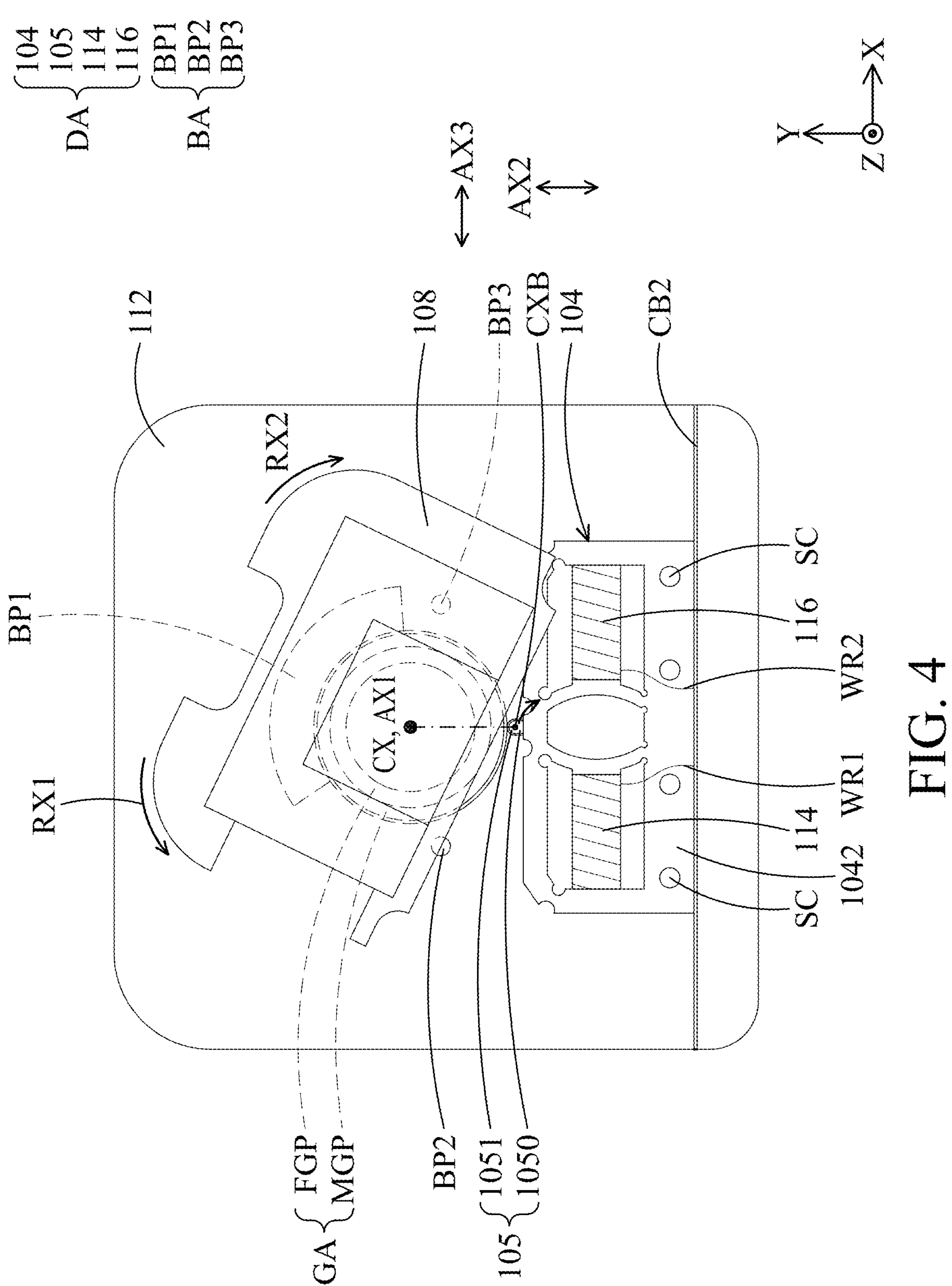
FIG. 4 is a top view of a partial structure of the optical system 100 according to an embodiment of the present disclosure.

Next, please refer to FIG. 1 to FIG. 4. FIG. 4 is a top view of a partial structure of the optical system 100 according to an embodiment of the present disclosure. In this embodiment, the driving assembly DA may include a first power source 114, a second power source 116, a transfer assembly 104 and a contact member 105.

The first power source 114 and the second power source 116 are configured to generate a first driving force. The first power source 114 can be a first piezoelectric element, and the second power source 116 can be a second piezoelectric element. The first piezoelectric element and the second piezoelectric element can be made of piezoelectric ceramics, but they are not limited thereto.

The transfer assembly 104 may have an elastic structure, and the bottom of the transfer assembly 104 may be affixed to the first base 112 through a plurality of locking elements SC. The locking elements SC are, for example, screws, but they are not limited thereto. Furthermore, the transfer assembly 104 is made of a first metal material. For example, the first metal material may include stainless steel, but it is not limited thereto.

The transfer assembly 104 is configured to receive the first driving force and then output an external driving force. For example, when the first power source 114 and the second power source 116 generate the first driving force, the transfer assembly 104 will be pushed to deform, thereby driving the contact member 105 to move. The contact member 105 is fixedly connected to the transfer assembly 104 and configured to transmit the external driving force to the movable part 108 to drive the movable part 108 to move.

As shown in FIG. 4, when viewed along the first axis AX1, the contact member 105 protrudes from the transfer assembly 104 toward the guiding assembly GA. In this embodiment, the contact member 105 is made of the second metal material. The second metal material may include tool steel, for example. The materials of transfer assembly 104 and contact member 105 are not limited to this embodiment.

In this embodiment, the contact member 105 may have a base portion 1050 and a contact portion 1051, and the base portion 1050 and the contact portion 1051 may be integrally formed as one piece. When viewed along the first axis AX1, the base portion 1050 may have a rectangular structure, and when viewed along the first axis AX1, the contact portion 1051 may have an arc-shaped structure.

It is worth noting that when viewed along the first axis AX1, the extending direction of the contact portion 1051 along the second axis AX2 passed through the center of the guiding assembly GA. For example, as shown in FIG. 4, the extending direction of the contact member 105 passes through a central axis CX of the guiding assembly GA, and the second axis AX2 is perpendicular to the first axis AX1.

Figure 5:
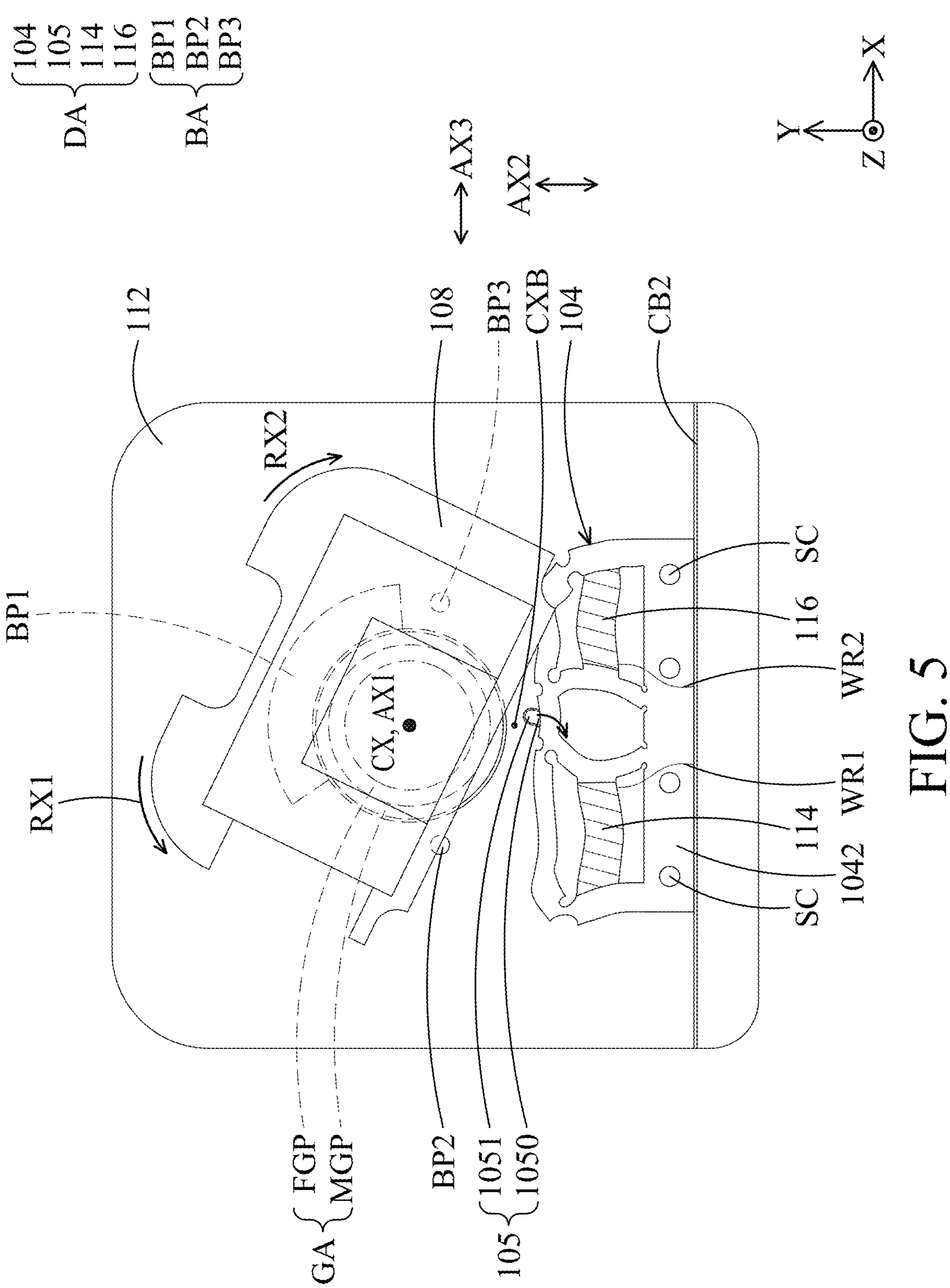
FIG. 5 to FIG. 7 are top views illustrating that the transfer assembly 104 deforms to drive the contact member 105 to different positions according to an embodiment of the present disclosure.
Figure 6:
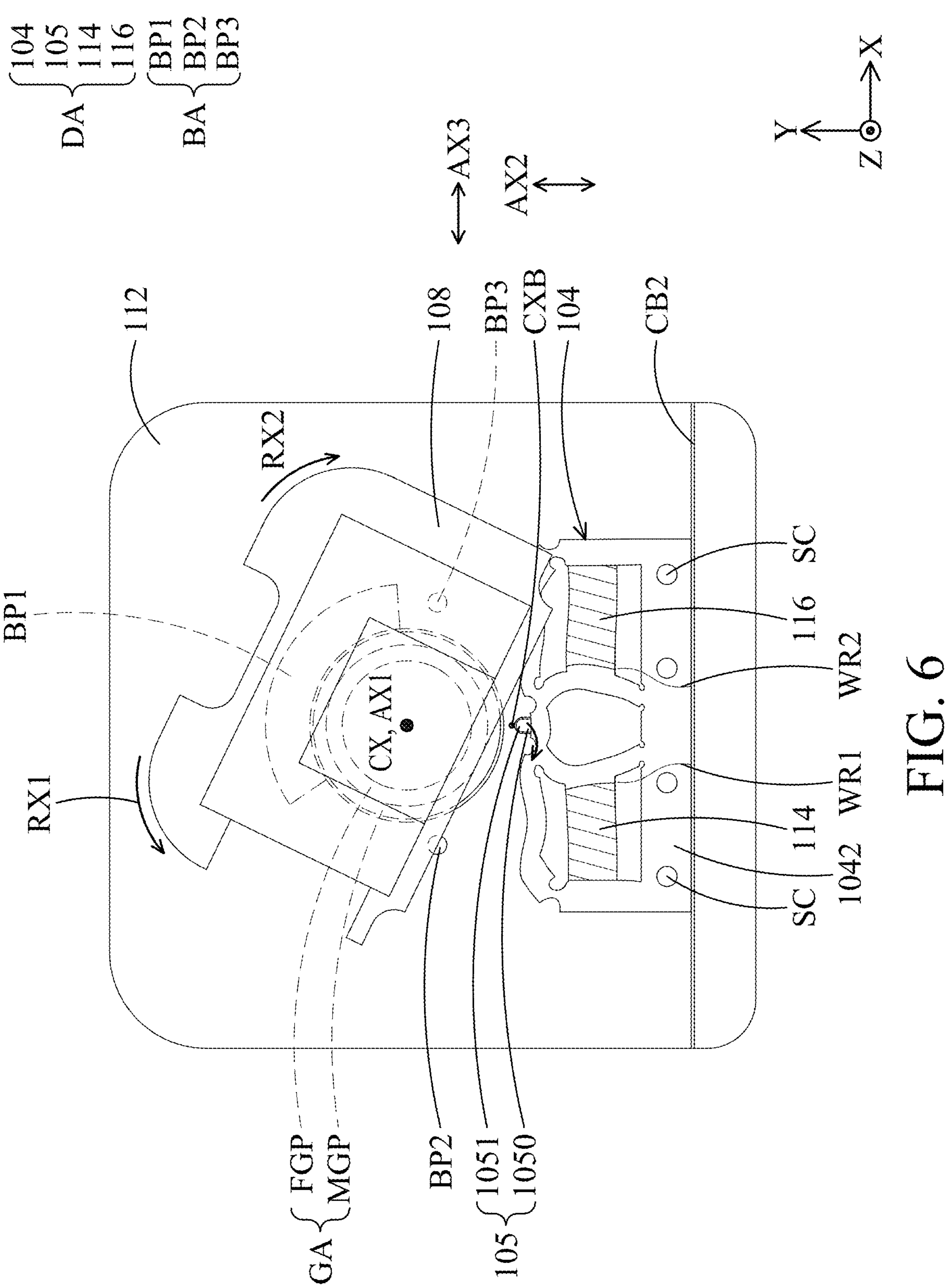
Figure 7:
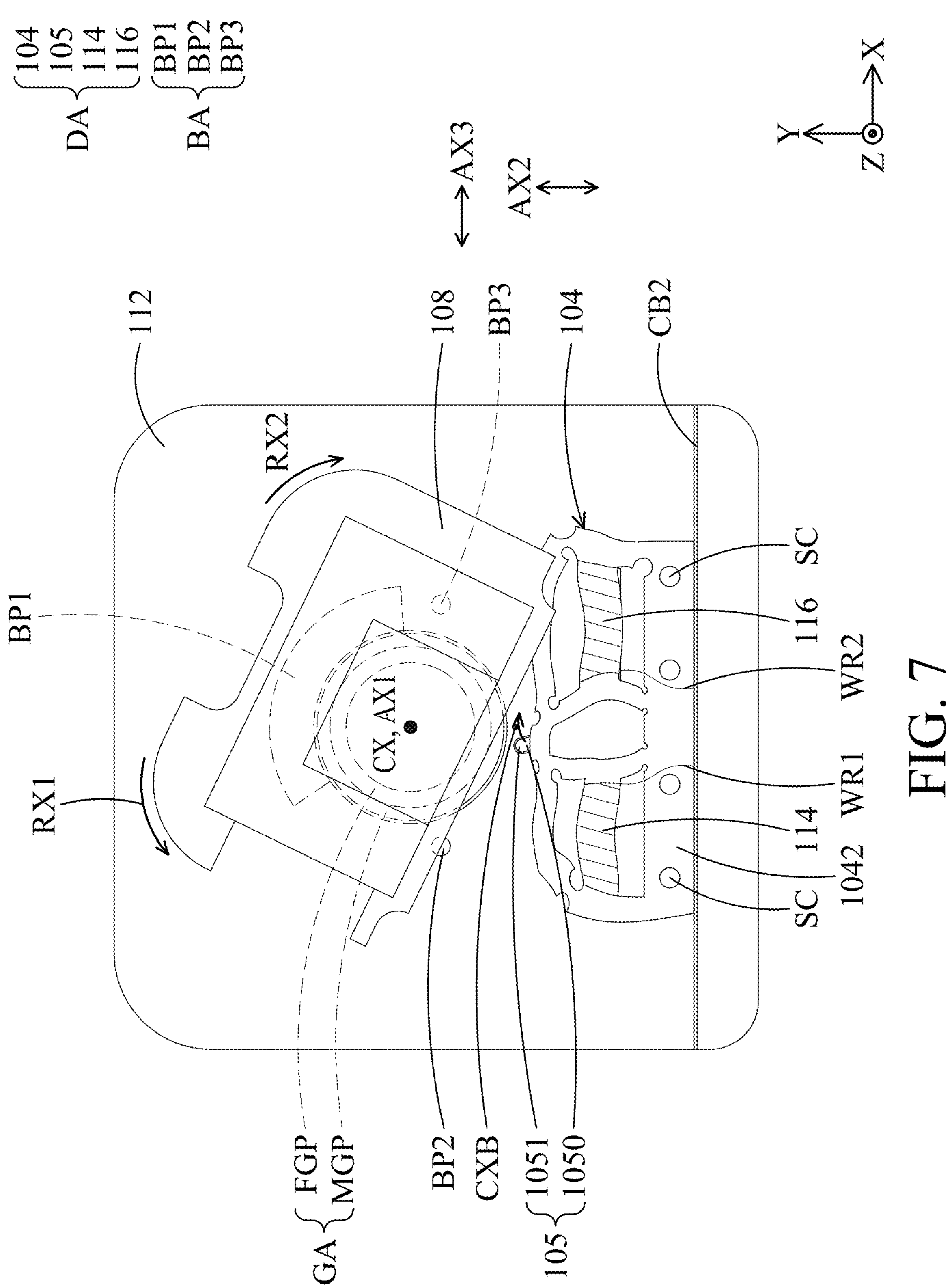

Next, please refer to FIG. 4 to FIG. 7. FIG. 5 to FIG. 7 are top views illustrating that the transfer assembly 104 deforms to drive the contact member 105 to different positions according to an embodiment of the present disclosure. In this embodiment, the first power source 114 and the second power source 116 are configured to receive a first control signal and a second control signal from a second basic member CB2 via two lead wires WR1 and WR2 respectively to generate deformation. The second basic member CB2 is electrically connected to the first power source 114 and the second power source 116, and the second basic member CB2 is, for example, a circuit board, which is fixedly disposed on the first base 112.

After receiving the above control signals, the first power source 114 and the second power source 116 deform according to the first control signal and the second control signal to push the transfer assembly 104, so that the transfer assembly 104 deforms to drive the contact member 105 to move relative to a base lateral arm 1042 of transfer assembly 104. That is, the base lateral arm 1042 does not deform.

The first control signal may be different from the second control signal. That is, the control circuit on the second basic member CB2 may independently control the first power source 114 and the second power source 116. Furthermore, the first control signal and the second control signal may be AC signals. For example, the first control signal may be a sine wave signal, and the second control signal may be a cosine wave signal, but they are not limited thereto.

It is worth noting that the frequency of the first control signal and the second control signal is equal to the overall resonant frequency of the transfer assembly 104, the first power source 114 and the second power source 116. Such a design can make the transfer assembly 104 easier to deform.

As shown in FIG. 4 to FIG. 7, when viewed along the first axis AX1 and when the phase difference between the first control signal and the second control signal is −90 degrees, the first power source 114 will expand first and the second power source 116 will contract first, so as to drive the transfer assembly 104 to deform, so that the contact member 105 moves from the position in FIG. 4 to the positions in FIG. 5, FIG. 6 and FIG. 7 in sequence, and then return to the position of FIG. 4.

That is, the contact member 105 can continuously rotate around a sub-axis CXB which is parallel to the first axis AX1 (the Z-axis). Specifically, a plane coordinate can be defined with sub-axis CXB as the origin, which is parallel to the XY axes, and the contact member 105 can rotate clockwise along the aforementioned plane coordinate from the first quadrant to the second quadrant, then to the third quadrant, and finally to the fourth quadrant. The movement trajectory of contact member 105 is elliptical. Therefore, as shown in FIG. 4 to FIG. 8, the contact member 105 will push the movable guiding portion MGP to rotate around the central axis CX, thereby driving the movable part 108 and the optical module 10 to move in a first rotating direction RX1.

On the contrary, when the phase difference between the first control signal and the second control signal is +90 degrees, the first power source 114 and the second power source 116 drive the transfer assembly 104 to deform, so that the contact member 105 rotates from the position in FIG. 4 to the positions in FIG. 7, FIG. 6, and FIG. 5 in sequence, and then returns to the position in FIG. 4.

That is, the contact member 105 can continuously rotate around the sub-axis CXB. Specifically, the contact member 105 can rotate counterclockwise along the fourth quadrant, the third quadrant, the second quadrant, and first quadrant of the aforementioned plane coordinate in sequence. The movement trajectory of contact member 105 is elliptical. Therefore, the contact member 105 will push the movable guiding portion MGP to rotate around the central axis CX, thereby driving the movable part 108 and the optical module 10 to move in a second rotating direction RX2. The second rotating direction RX2 is opposite to the first rotating direction RX1.

As shown in FIG. 4 to FIG. 7, when the first power source 114 and the second power source 116 are activated, the contact member 105 is configured to be driven by the transfer assembly 104 to switch between a disengaged state and a contact state to perform a reciprocating motion. For example, as shown in FIG. 5 to FIG. 7, in the detached state, the contact member 105 is not in contact with the guiding assembly GA. As shown in FIG. 4, in the contact state, the contact member 105 is in directly contact with the guiding assembly GA and pushes the guiding assembly GA.

Furthermore, in this embodiment, the optical system 100 may further include a stopping assembly BA configured to limit the motion of range of the movable part 108. The stopping assembly BA includes a first stopping portion BP1, a second stopping portion BP2 and a third stopping portion BP3. The first stopping portion BP1 is fixedly disposed on the bottom of the movable part 108, and the second stopping portion BP2 and the third stopping portion BP3 are disposed on the first base 112 of the fixed assembly FA.

As shown in FIG. 4, when viewed along the first axis AX1, the first stopping portion BP1 has an arc-shaped structure. As shown in FIG. 2 and FIG. 4, the second stopping portion BP2 and the third stopping portion BP3 each have a columnar structure and extend along the first axis AX1. As shown in FIG. 4, when viewed along the first axis AX1, the guiding assembly GA is located between the second stopping portion BP2 and the third stopping portion BP3.

Figure 8:
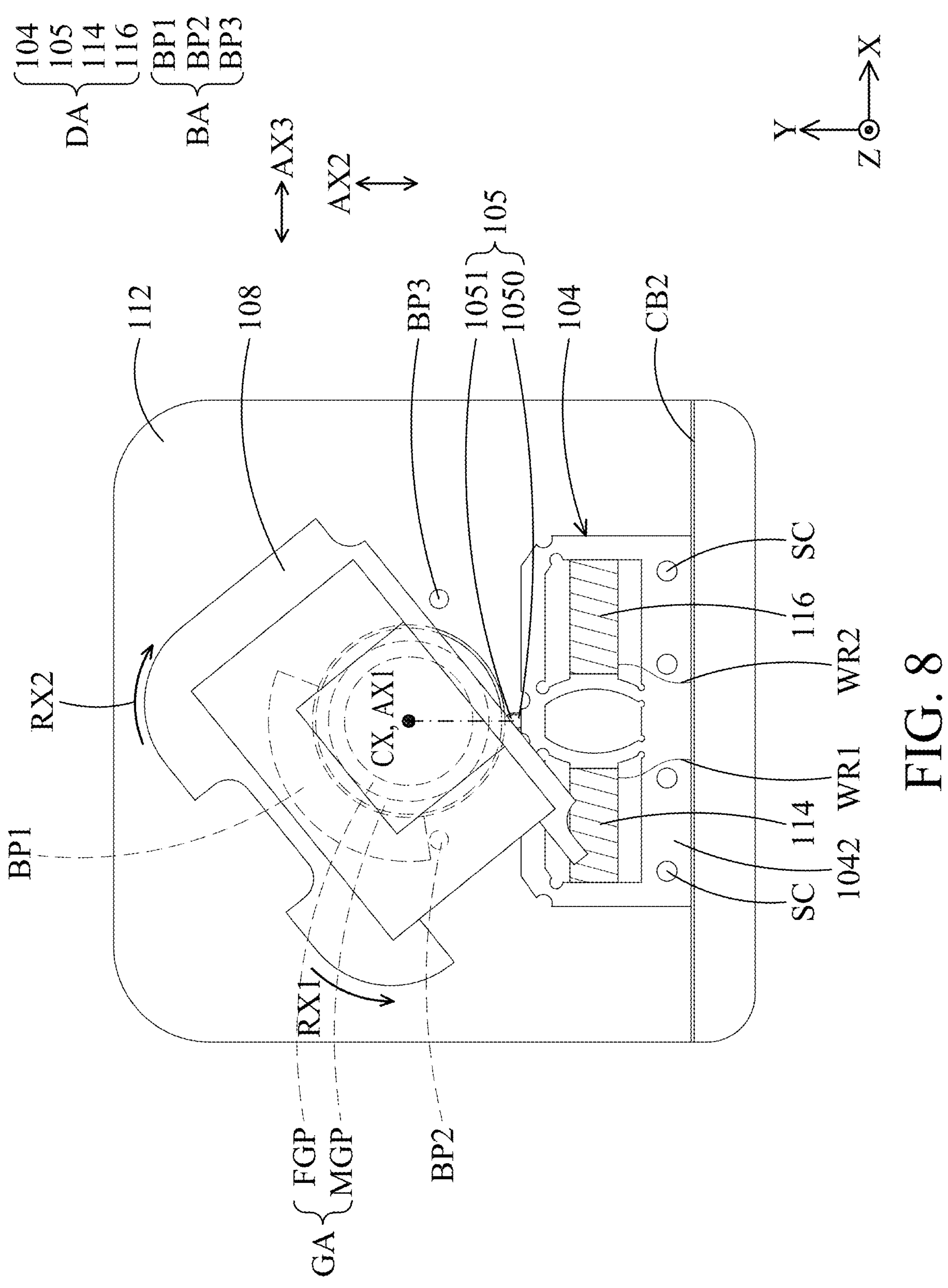
FIG. 8 is a top view illustrating that the movable part 108 is located in a first extreme position according to an embodiment of the present disclosure.

Furthermore, as shown in FIG. 8, which is a top view illustrating that the movable part 108 is located in a first extreme position according to an embodiment of the present disclosure. When the movable part 108 is driven to rotate in the first rotating direction RX1, the first stopping portion BP1 is configured to be in contact with the second stopping portion BP2. Specifically, when the movable part 108 rotates to the position in FIG. 8, the first stopping portion BP1 is in contact with the second stopping portion BP2, and at this time, the movable part 108 is located in the first extreme position.

Figure 9:
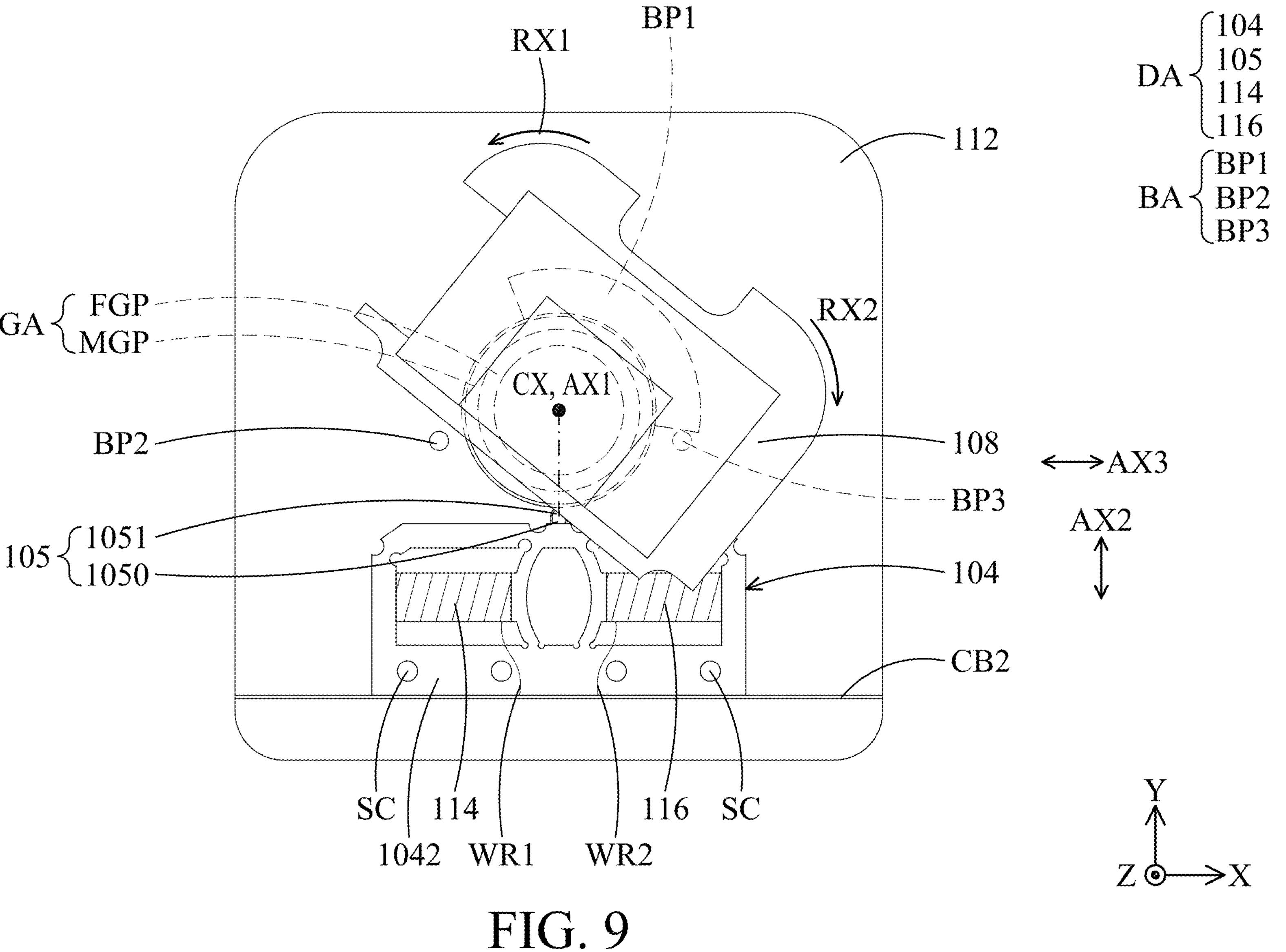
FIG. 9 is a top view illustrating that the movable part 108 is located in a second extreme position according to an embodiment of the present disclosure.

On the contrary, please refer to FIG. 9, which is a top view illustrating that the movable part 108 is located in a second extreme position according to an embodiment of the present disclosure. When the movable part 108 is driven in the second rotating direction RX2, the first stopping portion BP1 is configured to be in contact with the third stopping portion BP3. Specifically, when the movable part 108 rotates to the position in FIG. 9, the first stopping portion BP1 is in contact with the third stopping portion BP3, and at this time the movable part 108 is located in the second extreme position.

Next, please return to FIG. 3. As shown in FIG. 3, the movable guiding portion MGP of the guiding assembly GA defines the aforementioned central axis CX, and the central axis CX overlaps and/or is parallel to the first axis AX1. As shown in FIG. 3, when viewed along a third axis AX3 (the X-axis), the central axis CX passes through the center 150X of the image sensor 150.

The third axis AX3, the second axis AX2 and the first axis AX1 are perpendicular to each other. It is worth mentioning that based on the configuration of the central axis CX passing through the center 150X of the image sensor 150, it can ensure the accuracy when the driving assembly DA controls the rotation of the optical module 10.

In this embodiment, as shown in FIG. 2 and FIG. 3, the optical system 100 may further include a sensing assembly SA configured to sense the movement of the movable part 108 relative to the fixed assembly FA. The sensing assembly SA may have a reference element RE and a sensing element SE, and the sensing element SE corresponds to the reference element RE.

As shown in FIG. 3, when viewed along the first axis AX1, the sensing assembly SA overlaps at least a portion of the guiding assembly GA. For example, when viewed along the first axis AX1, the reference element RE overlaps the fixed guiding portion FGP of the guiding assembly GA. In this embodiment, the reference element RE may be a magnetic element, such as a multipole magnet or a tunnel magneto-resistive (TMR) sensor, but it is not limited thereto.

As shown in FIG. 3, the reference element RE is located in a first accommodation portion AP1 of the movable part 108, and the sensing element SE is located in a second accommodation portion AP2 of the positioning member 112P. When viewed along the first axis AX1, the first accommodation portion AP1 overlaps at least a portion of the second accommodation portion AP2, and the first accommodation portion AP1 is connected to the second accommodation portion AP2.

As shown in FIG. 3, when viewed along the third axis AX3, the central axis CX passes through the centers of the reference element RE and the sensing element SE. Based on this configuration, the control accuracy of the driving assembly DA can be ensured.

Furthermore, in this embodiment, the optical system 100 may further include a separating element SPE, which has a magnetically permeable material. For example, the separating element SPE can be a yoke, but it is not limited thereto. The separating element SPE is disposed in the first accommodation portion AP1 and is located between the reference element RE and the optical module 10. Based on the configuration of the separating element SPE, the magnetic field of the reference element RE can be prevented from interfering with the operation of the optical module 10.

Figure 10:
FIG. 10 is a perspective view of a partial structure of the optical system 100 according to an embodiment of the present disclosure.
Figure 10:
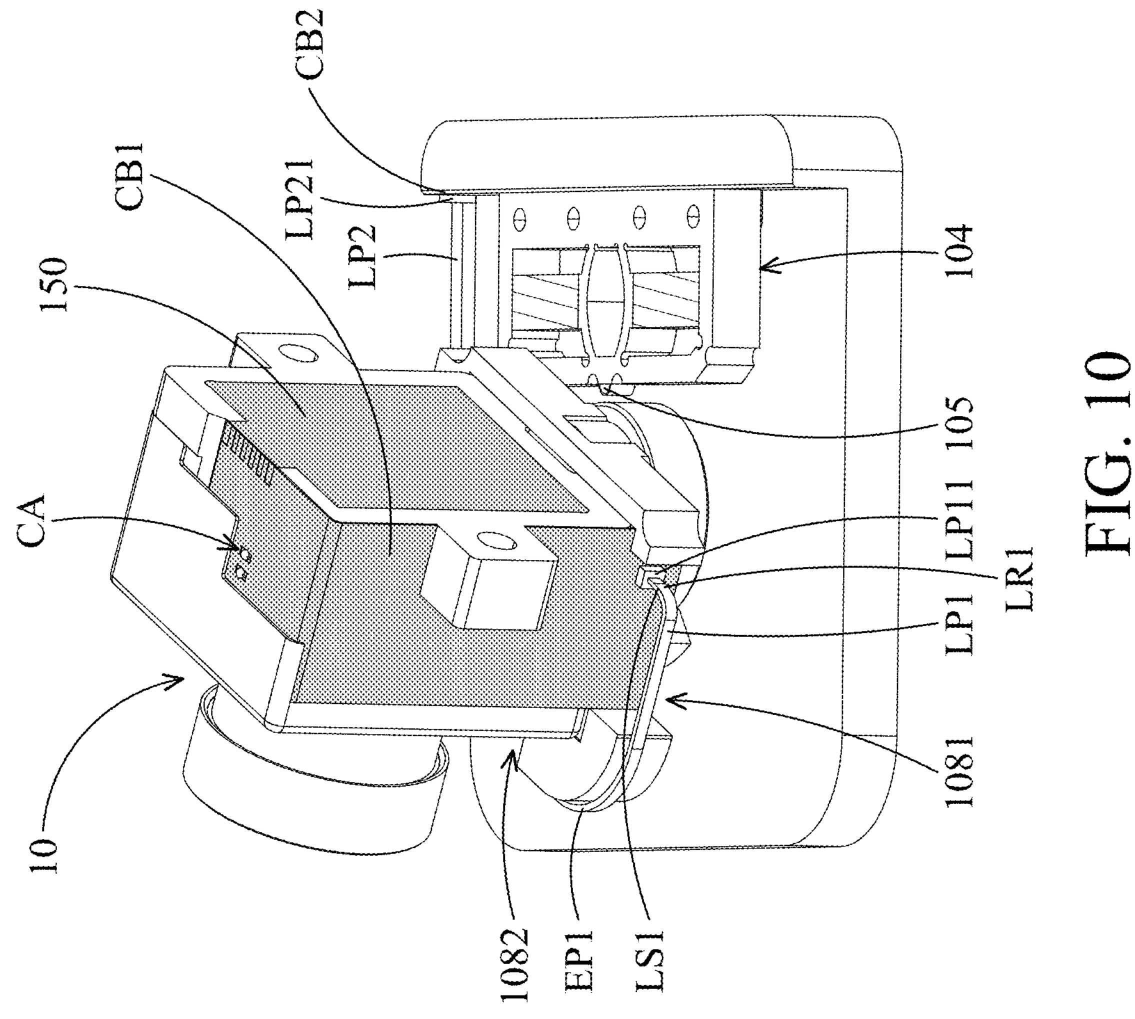
Figure 11:
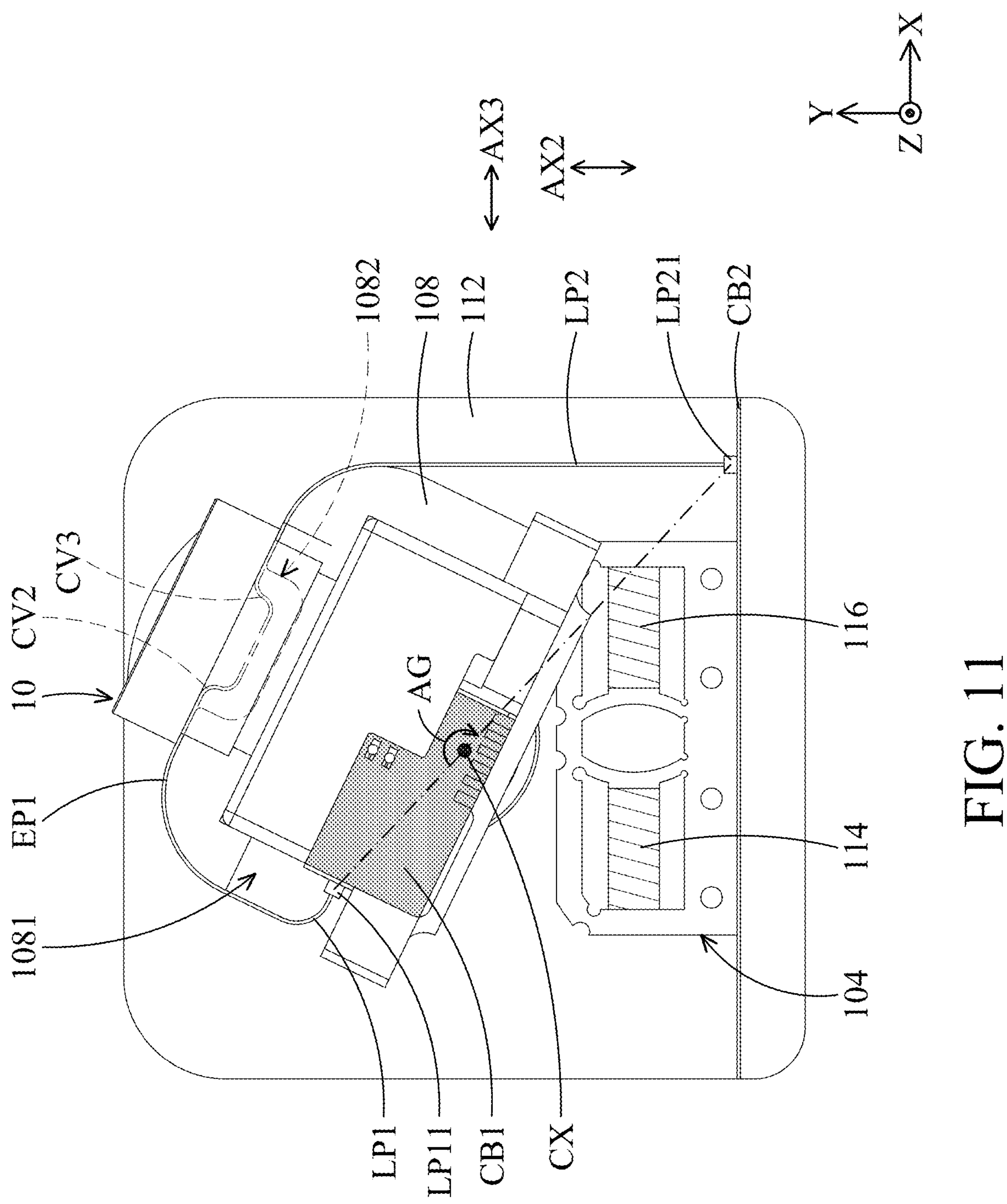
FIG. 11 is a top view of a partial structure of the optical system 100 according to an embodiment of the present disclosure.

Next, please refer to FIG. 10 and FIG. 11. FIG. 10 is a perspective view of a partial structure of the optical system 100 according to an embodiment of the present disclosure, and FIG. 11 is a top view of a partial structure of the optical system 100 according to an embodiment of the present disclosure. In this embodiment, the optical system 100 may further include a circuit assembly CA which is electrically connected to the optical module 10.

The circuit assembly CA may include a first basic member CB1 and the aforementioned second basic member CB2, and the first basic member CB1 is disposed on the optical module 10. The first basic member CB1 may have a plate-shaped structure. For example, the first basic member CB1 is a flexible circuit board, but it is not limited to this.

The circuit assembly CA may further include a first line portion LP1, which has a plate-shaped structure and is not parallel to the first basic member CB1. As shown in FIG. 10, the first line portion LP1 is extended from the first basic member CB1, and the first line portion LP1 is perpendicular to the first basic member CB1. As shown in FIG. 11, the first line portion LP1 is located at a first opening 1081 of the movable part 108.

Furthermore, the circuit assembly CA may further include a first extending portion EP1 which has a flexible structure, and the first extending portion EP1 has a plate-shaped structure. The first extending portion EP1 may have a plurality of curved portions. For example, as shown in FIG. 11, a part of the first extending portion EP1 (two curved portions CV2, CV3) is located in a second opening 1082 of the movable part 108.

The first extending portion EP1 is electrically connected to the first basic member CB1 via the first line portion LP1, and the first extending portion EP1 and the first line portion LP1 can be integrally formed as one piece.

Similarly, the circuit assembly CA may further include a second line portion LP2 which is electrically connected to the first line portion LP1 via the first extending portion EP1. The second line portion LP2 has a flexible structure, and the second line portion LP2, the first extending portion EP1 and the first line portion LP1 may be integrally formed as one piece. The second line portion LP2, the first extending portion EP1 and the first line portion LP1 may be a flexible flat cable (FFC), but they are not limited thereto.

As shown in FIG. 11, when viewed along the first axis AX1 (the Z-axis), the first line portion LP1, the second line portion LP2 and the first extending portion EP1 are located around the movable part 108. For example, when viewed along first axis AX1, the first line portion LP1, the second line portion LP2, and first extending portion EP1 surround the movable part 108 by at least 100 degrees.

Specifically, a first connection terminal LP11 of the first line portion LP1 is connected to the first basic member CB1, and a second connection terminal LP21 of the second line portion LP2 is connected to the second basic member CB2. As shown in FIG. 11, when viewed along the first axis AX1, the angle AG formed by the first connection terminal LP11, the center of the guiding assembly GA (such as the central axis CX) and the second connection terminal LP21 is greater than 100 degrees.

The first connection terminal LP11 and the second connection terminal LP21 can be connectors that are configured to be inserted into corresponding connectors (not shown in the figures) on the first basic member CB1 and the second basic member CB2 respectively.

In addition, it should be noted that, as shown in FIG. 10, the first line portion LP1 has a long side LS1 which is perpendicular to the first basic member CB1, and the first line portion LP1 has an outer side LR1 which is parallel to the first axis AX1 (the Z-axis).

Based on the above structural design and configuration of the second line portion LP2, the first extending portion EP1 and the first line portion LP1, it can be ensured that when the movable part 108 moves, the second line portion LP2, the first extending portion EP1 and the first line portion LP1 can move smoothly along with the movable part 108 without excessive bending, thereby avoiding damage to the second line portion LP2, the first extending portion EP1 and the first line portion LP1.

Figure 12:
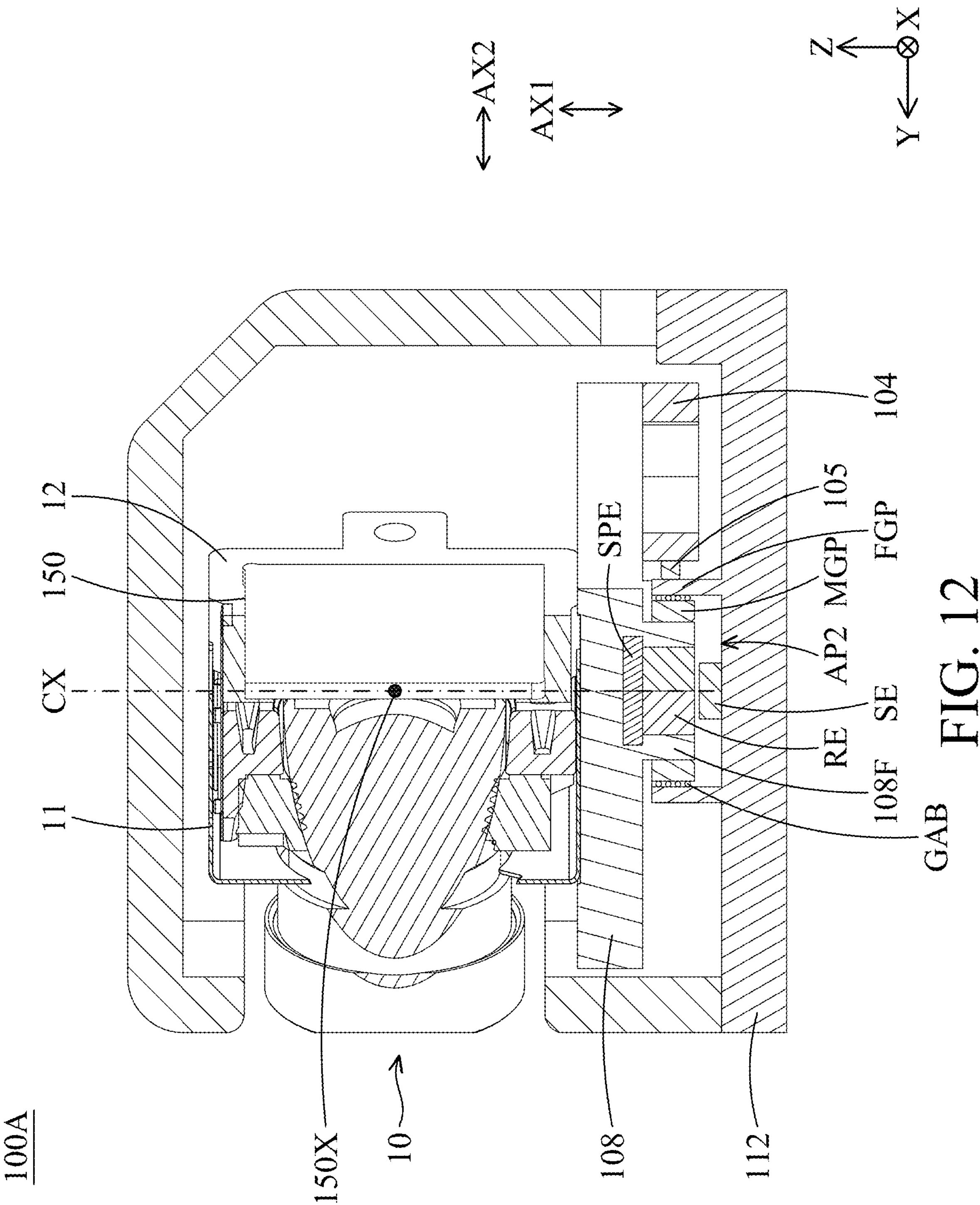
FIG. 12 is a cross-sectional view of an optical system 100A according to another embodiment of the present disclosure.

Next, please refer to FIG. 12, which is a cross-sectional view of an optical system 100A according to another embodiment of the present disclosure. In this embodiment, the transfer assembly 104 is fixedly disposed on the bottom of the movable part 108, and the fixed guiding portion FGP and the aforementioned positioning member 112P are integrally formed as one piece. Furthermore, the movable guiding portion MGP is located in the fixed guiding portion FGP, and the fixed guiding portion FGP surrounds the movable guiding portion MGP.

In this embodiment, the movable part 108 may have a shaft member 108F which extends along the first axis AX1 toward the first base 112. The movable guiding portion MGP is fixedly connected to shaft member 108F. Specifically, the movable guiding portion MGP is sheathed on shaft member 108F. When viewed along the second axis AX2, the transfer assembly 104 overlaps the movable guiding portion MGP, the fixed guiding portion FGP, and the shaft member 108F.

In this embodiment, the contact member 105 is configured to contact the fixed guiding portion FGP. When the contact member 105 is driven by the transfer assembly 104 and pushes the fixed guiding portion FGP, a reaction force will be generated to drive the driving assembly DA and the movable part 108 to move relative to the first base 112. The manner in which the driving assembly DA drives the movable part 108 is similar to the previous embodiments, and therefore it is not be described again herein. This configuration facilitates the transfer assembly 104 to be electrically connected to the circuit assembly CA. That is, the transfer assembly 104 shares the same circuit assembly CA as the source of control signal and power with the optical module 10, and the second basic member CB2 is not required, thereby saving space and cost.

In conclusion, the present disclosure provides an optical system, which includes a fixed assembly, a movable part and a driving assembly. The movable part is configured to be connected to an optical module, and the movable part is movable relative to the fixed assembly. The driving assembly is configured to drive the movable part to move relative to the fixed assembly. The optical system further includes a guiding assembly, and the movable part moves relative to the fixed assembly through the guiding assembly. The driving assembly can include piezoelectric elements, so that the heavy optical module can be driven quickly.

In some embodiments, the driving assembly includes a transfer assembly 104, a contact member 105, a first power source 114 and a second power source 116. The first power source 114 and the second power source 116 deform according to the external control signals to push the transfer assembly 104, so that the transfer assembly 104 will deform to drive the contact member 105 to move. The movement trajectory of the contact member 105 may be, for example, elliptical.

When the contact member 105 rotates clockwise rapidly (for example, rotating at a frequency of 1000 Hz), the contact member 105 can drive the movable guiding portion MGP to rotate counterclockwise by contacting the movable guiding portion MGP of the guiding assembly GA multiple times. On the contrary, when the contact member 105 rotates counterclockwise rapidly, the contact member 105 can drive the movable guiding portion MGP to rotate clockwise by contacting the movable guiding portion MGP multiple times. Based on such a design, the movable part 108 and the optical module 10 can be driven quickly to achieve the functions such as object tracking or optical compensation.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:

a fixed assembly:

a movable part, configured to be connected to an optical module, wherein the movable part is movable relative to the fixed assembly; and a driving assembly, configured to drive the movable part to move relative to the fixed assembly, wherein the optical system further includes a guiding assembly, and the movable part moves relative to the fixed assembly through the guiding assembly;

the fixed assembly has an outer cover and a first base;

the outer cover and the first base are arranged along a first axis;

the outer cover is fixedly connected to the first base to form an accommodation space;

the accommodation space is configured to accommodate the movable part, the optical module and the driving assembly;

the optical module and the movable part are arranged along the first axis;

the optical module is fixedly disposed on the movable part;

the guiding assembly includes a fixed guiding portion and a movable guiding portion;

the fixed guiding portion is fixedly connected to the fixed assembly;

the fixed guiding portion is fixedly connected to a positioning member of the fixed assembly;

the positioning member protrudes from the first base along the first axis;

the movable guiding portion is fixedly connected to the movable part;

the movable guiding portion is movable relative to the fixed guiding portion;

the movable part is configured to rotate with the movable guiding portion relative to the fixed guiding portion and the fixed assembly around the first axis;

the driving assembly includes a first power source, a transfer assembly and a contact member;

the first power source is configured to generate a first driving force;

the first power source includes a first piezoelectric element;

the transfer assembly is configured to receive the first driving force and then output an external driving force;

the transfer assembly has an elastic structure;

the contact member is fixedly connected to the transfer assembly and configured to transmit the external driving force to the movable part;

the contact member is configured to be driven by the transfer assembly to switch between a disengaged state and a contact state;

in the disengaged state, the contact member is not in contact with the guiding assembly;

in the contact state, the contact member is in direct contact with the guiding assembly.

2. The optical system as claimed in claim 1, wherein when viewed along the first axis, the contact member protrudes from the transfer assembly toward the guiding assembly;

the contact member is made of a metal material;

the contact member includes tool steel.

3. The optical system as claimed in claim 2, wherein the contact member has a base portion and a contact portion;

the base portion and the contact portion are integrally formed as one piece;

when viewed along the first axis, the base portion has a rectangular structure;

when viewed along the first axis, the contact portion has an arc-shaped structure;

when viewed along the first axis, an extending direction of the contact portion along a second axis passes through a center of the guiding assembly;

the second axis is perpendicular to the first axis.

4. The optical system as claimed in claim 3, wherein the optical module includes an image sensor, which is disposed on a second base of the optical module;

the movable guiding portion of the guiding assembly defines a central axis;

the central axis is parallel to the first axis;

when viewed along a third axis, the central axis passes through a center of the image sensor.

5. The optical system as claimed in claim 4, wherein the optical system further includes a stopping assembly configured to limit range of motion of the movable part;

the stopping assembly includes a first stopping portion, a second stopping portion and a third stopping portion;

the first stopping portion is fixedly disposed on the movable part;

the second stopping portion and the third stopping portion are disposed on the first base of the fixed assembly.

6. The optical system as claimed in claim 5, wherein when viewed along the first axis, the first stopping portion has an arc-shaped structure;

the second stopping portion and the third stopping portion each have a columnar structure which extends along the first axis;

when viewed along the first axis, the guiding assembly is located between the second stopping portion and the third stopping portion;

the third stopping portion;

when the movable part rotates in a first rotating direction, the first stopping portion is configured to be in contact with the second stopping portion;

when the first stopping portion is in contact with the second stopping portion, the movable part is located at a first extreme position.

7. The optical system as claimed in claim 6, wherein when the movable part rotates in a second rotating direction, the first stopping portion is configured to be in contact with the third stopping portion;

when the first stopping portion is in contact with the third stopping portion, the movable part is located at a second extreme position;

the first rotating direction is opposite to the second rotating direction.

8. The optical system as claimed in claim 7, wherein the optical system further includes a sensing assembly configured to sense movement of the movable part relative to the fixed assembly;

the sensing assembly has a reference element and a sensing element;

the sensing element corresponds to the reference element;

when viewed along the first axis, the sensing assembly overlaps at least a portion of the guiding assembly.

9. The optical system as claimed in claim 8, wherein the reference element has a magnetic element;

the optical system also includes a separating element, which has a magnetically permeable material;

the separating element is disposed between the reference element and the optical module;

the reference element is located in a first accommodation portion of the movable part;

the sensing element is located in a second accommodation portion of the positioning member.

10. The optical system as claimed in claim 9, wherein when viewed along the first axis, the first accommodation portion overlaps at least a portion of the second accommodation portion;

the first accommodation portion is connected to the second accommodation portion;

when viewed along the third axis, the central axis passes through centers of the reference element and the sensing element.

11. The optical system as claimed in claim 10, wherein the optical system further includes a circuit assembly which is electrically connected to the optical module;

the circuit assembly includes a first basic member which is disposed on the optical module;

the first basic member has a plate-shaped structure;

the circuit assembly further includes a first line portion which has a plate-shaped structure and is not parallel to the first basic member;

the first line portion is located at a first opening of the movable part.

12. The optical system as claimed in claim 11, wherein the circuit assembly further includes a first extending portion which has a flexible structure;

the first extending portion has a plate-shaped structure;

the first extending portion has a plurality of curved portions;

a part of the first extending portion is located in a second opening of the movable part;

the first extending portion is electrically connected to the first basic member via the first line portion;

the first extending portion and the first line portion are integrally formed as one piece.

13. The optical system as claimed in claim 12, wherein the circuit assembly further includes a second line portion which is electrically connected to the first line portion via the first extending portion;

the second line portion has a flexible structure;

the second line portion, the first extending portion and the first line portion are integrally formed as one piece.

14. The optical system as claimed in claim 13, wherein when viewed along the first axis, the first line portion, the second line portion and the first extending portion are located around the movable part;

when viewed along the first axis, the first line portion, the second line portion and the first extending portion surround the movable part by at least 100 degrees;

a first connection terminal of the first line portion is connected to the first basic member;

a second connection terminal of the second line portion is connected to a second basic member.

15. The optical system as claimed in claim 14, wherein the first line portion has a long side which is perpendicular to the first basic member, and the first line portion has an outer side which is parallel to the first axis;

the second basic member is electrically connected to the first power source;

when viewed along the first axis, an angle formed by the first connection terminal, the center of the guiding assembly and the second connection terminal is greater than 100 degrees.

16. The optical system as claimed in claim 1, wherein the transfer assembly is fixedly disposed on the movable part;

the fixed guiding portion and the positioning member are integrally formed as one piece;

the movable guiding portion is located in the fixed guiding portion;

the fixed guiding portion surrounds the movable guiding portion.

17. The optical system as claimed in claim 16, wherein the movable part has a shaft member which extends along the first axis toward the first base;

the movable guiding portion is fixedly connected to the shaft member;

the movable guiding portion is sheathed on the shaft member;

when viewed along a second axis, the transfer assembly overlaps the movable guiding portion, the fixed guiding portion and the shaft member;

the contact member is configured to contact the fixed guiding portion to generate a reaction force to drive the driving assembly and the movable part to move relative to the first base.

* * * * *